(12) United States Patent
Blum et al.

(10) Patent No.: US 10,635,476 B2
(45) Date of Patent: Apr. 28, 2020

(54) CLOUD ARCHITECTURE FOR AUTOMATED TESTING

(71) Applicant: Microsoft Technology Licensing, LLC, Redmond, WA (US)

(72) Inventors: William Blum, Bellevue, WA (US); Patrice Godefroid, Redmond, WA (US); David Molnar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 15/610,264

(22) Filed: May 31, 2017

(65) Prior Publication Data

US 2018/0329788 A1   Nov. 15, 2018

Related U.S. Application Data

(60) Provisional application No. 62/503,687, filed on May 9, 2017.

(51) Int. Cl.
*G06F 11/00* (2006.01)
*G06F 9/00* (2006.01)
(Continued)

(52) U.S. Cl.
CPC ...... *G06F 9/45558* (2013.01); *G06F 11/1484* (2013.01); *G06F 11/3688* (2013.01);
(Continued)

(58) Field of Classification Search
CPC ....... G06F 11/1484; G06F 11/36; G06F 11/14
See application file for complete search history.

(56) References Cited

U.S. PATENT DOCUMENTS

| 8,181,159 B2 | 5/2012 | Khalil et al. |
| 8,966,632 B1 * | 2/2015 | Huang ................. G06F 21/566 713/183 |

(Continued)

OTHER PUBLICATIONS

"Virtualized Network Isolation for a Malware Analysis Lab", https://zeltser.com/vmware-network-isolation-for-malware-analysis/, Published on: Feb. 9, 2015, 4 pages.

(Continued)

*Primary Examiner* — Marc Duncan
*Assistant Examiner* — Jonathan D Gibson
(74) *Attorney, Agent, or Firm* — Schwegman Lundberg & Woessner, P.A.

(57) ABSTRACT

Apparatus and methods can be implemented to perform software testing or to perform emulated hardware testing using a cloud architecture that can utilize centralized testing technology and can enable scaling up to test for multiple tenants and scaling up to arbitrary numbers of programs tested for each tenant. A user can configure an initial test virtual machine on a cloud platform for a cloud service over a physical network such as the Internet. Components of the cloud architecture can create a set of clones of the initial test virtual machine and inject tools into each clone for testing. Testing of one or more clones of the set can be conducted in an environment isolated from the physical network and isolated from a backend of the cloud service. Additional apparatus, systems, and methods are disclosed.

24 Claims, 11 Drawing Sheets

(51) Int. Cl.
  *G06F 9/455* (2018.01)
  *G06F 11/36* (2006.01)
  *G06F 11/14* (2006.01)

(52) U.S. Cl.
  CPC .............. *G06F 11/3696* (2013.01); *G06F 2009/45562* (2013.01); *G06F 2009/45591* (2013.01); *G06F 2201/815* (2013.01); *G06F 2201/84* (2013.01)

(56) References Cited

U.S. PATENT DOCUMENTS

| | | | |
|---|---|---|---|
| 9,032,373 | B1 | 5/2015 | Gupta et al. |
| 9,063,763 | B2 | 6/2015 | Astete et al. |
| 9,110,496 | B1 | 8/2015 | Michelsen |
| 9,361,168 | B1 | 6/2016 | Gantt et al. |
| 2007/0022324 | A1* | 1/2007 | Chang ................. G06F 11/3688 714/38.14 |
| 2009/0300423 | A1 | 12/2009 | Ferris |
| 2010/0293144 | A1 | 11/2010 | Bonnet |
| 2012/0054551 | A1 | 3/2012 | Gao et al. |
| 2013/0080999 | A1* | 3/2013 | Yang ................... G06F 11/3664 717/124 |
| 2013/0097706 | A1* | 4/2013 | Titonis .................... G06F 21/56 726/24 |
| 2015/0100832 | A1* | 4/2015 | Nanjundappa ...... G06F 11/3688 714/38.14 |
| 2016/0378521 | A1* | 12/2016 | Bektas ................ G06F 9/45558 718/1 |

OTHER PUBLICATIONS

"Using Virtual Machine Snapshots to Test Your Software (and How VMware Performance Monitoring Can Help)", http://www.opvizor.com/using-virtual-machine-snapshots-to-test-your-software-and-how-vmware-performance-monitoring-can-help/, Retrieved on: Jun. 21, 2016, 3 pages.

"How it works: Development and Test Smart Labs", https://www.ravellosystems.com/solutions/cloud-test-dev/vmware-kvm-on-aws-cloud, Published on: Mar. 24, 2017, 3 pages.

* cited by examiner

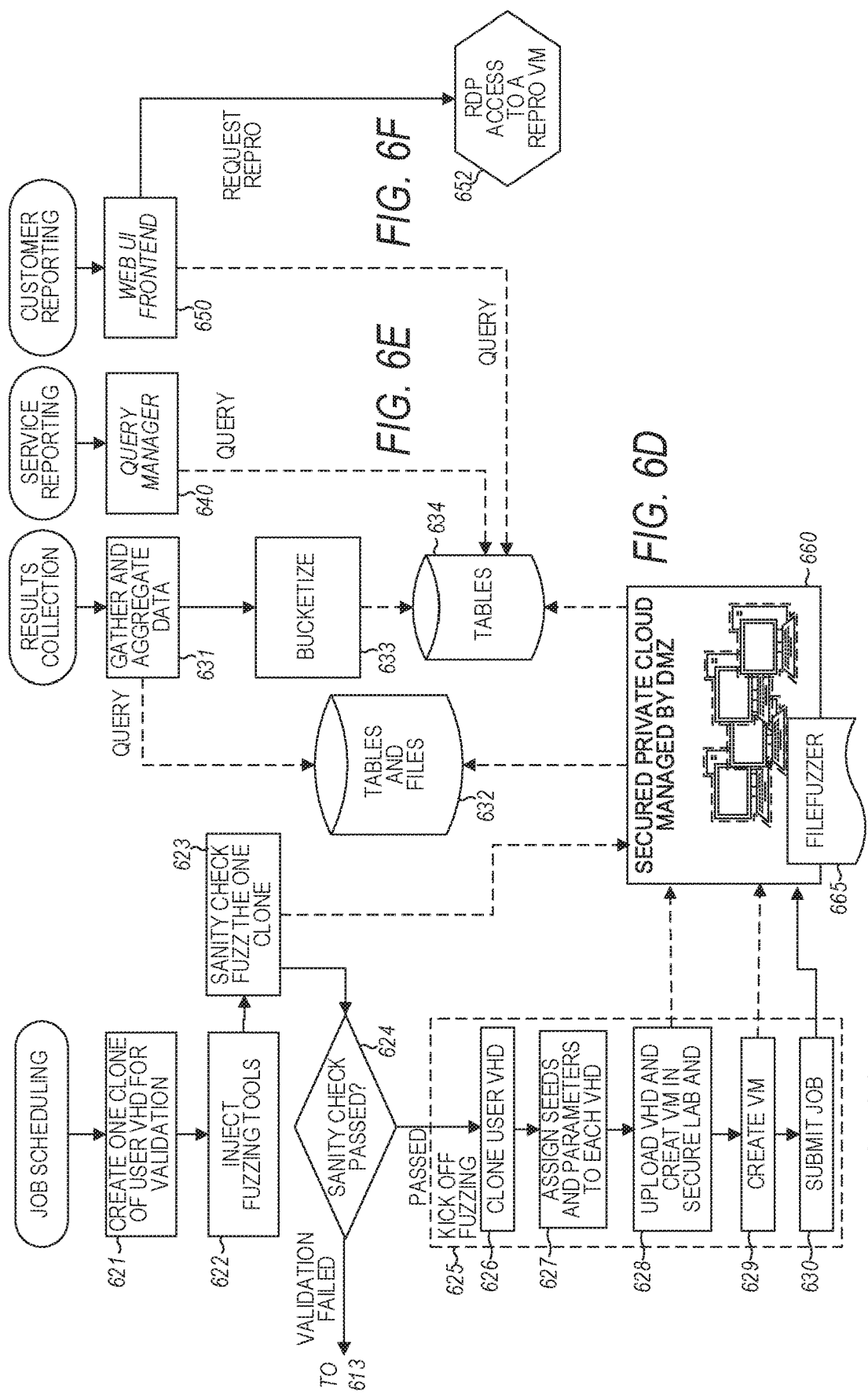

US 10,635,476 B2

CLOUD ARCHITECTURE FOR AUTOMATED TESTING

RELATED APPLICATION

This application claims priority under 35 U.S.C. 119(e) from U.S. Provisional Application Ser. No. 62/503,687, filed 9 May 2017, which application is incorporated herein by reference in its entirety.

TECHNICAL FIELD

Embodiments described herein generally relate to testing, and, in particular but without limitation, cloud architectures for testing.

BACKGROUND

System and software developers need to test software at scale and at any time; in particular, software developers need to test such software for security flaws. However, developers have used on-premise testing labs, which are hard to expand once testing capacity is reached. In addition, some testing methods require large amounts of computational power to get started, or require specialized tuning to work properly. For such testing methods, on premise labs cannot even use such methods without great expense.

BRIEF DESCRIPTION OF THE DRAWINGS

FIGS. 6A-6F are example work flows of fuzzing virtual machine management of a job submitted by a user using the example cloud architecture of FIG. 4, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Typically, the term "cloud" with respect to data processing and communicating refers to a datacenter full of servers that is connected to the Internet. However, cloud may refer to any network or combinations of networks. A cloud can include a wide area network (WAN) like the public Internet or a private, national or global network, and may include a local area network (LAN) within an organization providing the services of the datacenter. In addition, the term "cloud computing" refers to the software and services executed for users by these servers, and typically the user is unaware of the physical location of the servers or datacenter. Further, the datacenter may be a distributed entity. Cloud computing can provide shared computer processing resources and data to computers and other devices on demand over the associated networks.

In various embodiments, a cloud architecture for automated testing can provide a service that can handle multiple tenants, where the multiple tenants are enabled to utilize cloud scale and centralized testing technology. The centralized testing technology can include security testing technology. In addition, to scaling up to multiple tenants, a cloud architecture, as taught herein, can scale up to arbitrary numbers of programs tested for each tenant. Such cloud architectures can be structured for embedding proprietary testing methods into the cloud service, such as but not limited to security testing methods, in which the user cannot directly access the testing methods. Test virtual machines can be scaled up for testing services or software to be run on a cloud platform. A user, such as a customer of a cloud service, can configure an initial test virtual machine on a cloud platform. One or more components of the cloud architecture can then scale to test the service/software by creating multiple tenant virtual machines with the user configuration, can run the tests, and can report results.

Figure 1:
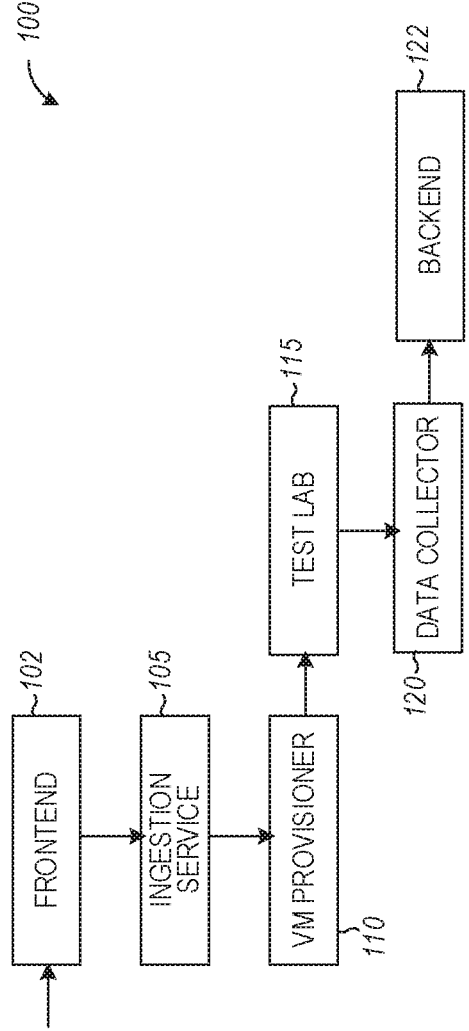
FIG. 1 is a block diagram of an example cloud architecture to test software or to perform emulated hardware testing, in accordance with various embodiments.

FIG. 1 is a block diagram of an embodiment of a cloud architecture 100 to test software or to perform emulated hardware testing. Cloud architecture 100 can include an ingestion service 105 to provide multiple copies of a user virtual machine (VM), which are clones of the user VM, a VM provisioner 110 to provision the clones, a test lab 115 to test the provisioned clones, and a data collector 120 to extract results from the testing in test lab 115. Cloud architecture 100 can include a front end 102 to receive user test requests and include a back end 122 in which results of testing can be stored. The results of testing may be provided to the user via the front end 102. The results of the testing can be provided to the user with a prioritized list of issues from the testing and an estimate as to the basis for the occurrence each issue. A front end is a presentation layer of software, such as application software, which can be an interface to the software for a user. Back end refers to a data access layer of the software, physical infrastructure, or hardware. Data of a process can be stored in databases of the back end. Cloud architecture 100 can be built on or integrated with a cloud computing platform.

A virtual machine is a self-contained operating system or application environment that is installed on software, which imitates hardware and allows an end user to have an experience on a virtual machine that is the same as on the hardware. A system virtual machine provides an operating environment that functions as a separate computer, without access to a host operating system. A process virtual machine provides an application virtual machine as a platform-independent execution environment that itself runs as a normal application inside a host operating system and enables programs written for the virtual machine to execute in the same manner on any platform. Cloud architecture 100 can be operable with a system virtual machine or an application virtual machine provided by a user as a virtual machine for testing.

Front end 102 of cloud architecture 100 can receive a request, over a physical network such as the Internet, from a user for testing. The user can provide a VM submitted by the user with the user's own tools. The user can submit more than binaries, that is, the user can set up the subject VM configured according to the user design. The user can install the bits and dependencies that the user deems as part of the VM to be tested. The service supported by cloud architecture 100 can operate on the user configured VM, instead of just operating on a zip file or a binary file.

Ingestion service 105 can consume VMs submitted by users containing untrusted code and generate multiple clones of each submitted VM. These clones can be provisioned by VM provisioner 110, where the provisioning can include injecting tools into the clones for testing in cloud architecture 100. Cloning provides a mechanism to provide scalability to the testing. VM provisioner 110 may also provision test lab 115 for the submitted request as an isolated environment in which the clones of a submitted VM can be tested, where the isolated environment is isolated from the back end 122 of the cloud service and from the physical network. The isolated environment may be a fuzzing lab, in which the clone VMs can be subjected to testing. Fuzzing is an automated software testing technique that involves providing invalid, unexpected, or random data as inputs to a test subject such as a computer program. Monitoring of the test subject is conducted for exceptions to the operation of the test subject such as crashes or failing built-in code assertions. The monitoring can be used to find potential incorrect management of memory allocations. The monitoring can be further extended to find potential incorrect executions of the program defined by the operator of the service. With isolation of test lab 115, test lab 115 can run untrusted binaries such that any binary that is submitted by an external user can be tested without concerns regarding malware spreading from the untrusted binaries to other resources in the back end 122 of the cloud service. In addition, the user and other external entities do not have direct access to test lab 115.

Data collector 120 can be coupled to test lab 115 to extract results from the testing conducted in test lab 115. Data collector 120 can provide the isolation of test lab 115 from the back end 122 by controlling operations to report results of the testing. Such operations can include operations to communicate the results between the test lab and the back end 122 of the cloud service through a subnetwork that controls data flow between test lab 115 and the back end 122 that isolates the test lab from the back end 122. Data collector 120 can be included as part of a demilitarized zone (DMZ) VM that isolates test lab 115 having a workload with untrusted code that originated from users, while providing a mechanism to communicate with the back end 122. Test lab 115 can be isolated from the physical network by a network security group (NSG), which is a feature that establishes criteria for securely running virtual networks of VMs, while the DMZ VM controls data flow from the test lab 115 to the back end 122 such that test lab 115 cannot communicate directly with the back end 122.

Ingestion service 105, VM provisioner 110, test lab 115, data collector 120, and other operational modules and mechanisms, as taught herein, can be realized as software, which can be deployed as a set of physical entities providing instructions that, when executed, causes performance of the functions of ingestion service 105. VM provisioner 110, test lab 115, data collector 120. Ingestion service 105, VM provisioner 110, test lab 115, data collector 120, and other operational modules and mechanisms can be realized as software and hardware to store the instructions and execute the functions of ingestion service 105, VM provisioner 110, test lab 115, data collector 120, and other operational modules and mechanisms.

Variations of cloud architecture 100 can be realized to provide cloud testing of programs, VMs, and other objects. Such variation can include addition of components to facilitate operation of the features of cloud architecture 100 or combinations of components of cloud architecture 100. For instance, test lab 115 and data collector 120 may realized as an integrated module or process. Variations of cloud architecture 100 may also provide ability to dynamically provision virtual machines on a cloud service in order to run software or emulated hardware testing.

Figure 2:
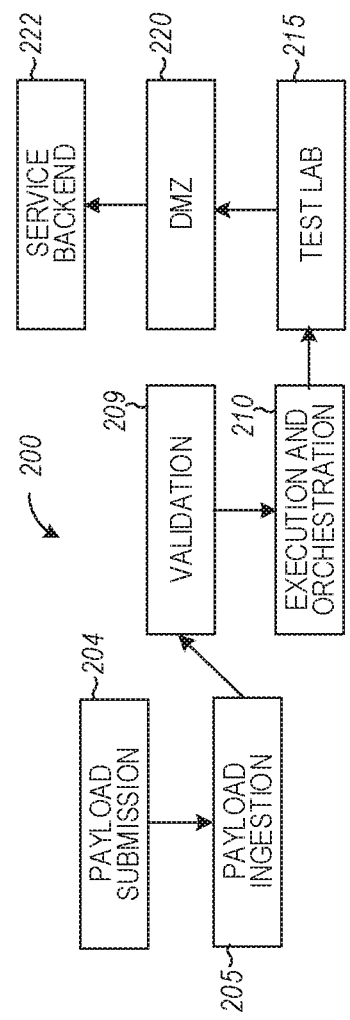
FIG. 2 is a block diagram of an embodiment of an example cloud architecture operable to conduct scalable testing, in accordance with various embodiments.

FIG. 2 is a block diagram of an embodiment of an example cloud architecture 200 operable to conduct scalable testing. Cloud architecture 200 can include a test payload submission mechanism 204 that provides for a user to connect to a VM provisioned by the cloud service and install and configure the test directly on the VM with all the tools and software that the user wants to test, before submitting the payload for testing to the service. The VM provided to the user may also include a bootstrap script used to subsequently install testing tools. A test payload ingestion mechanism 205 can include the cloud service taking a snapshot image of the VM configured by the user.

Cloud architecture 200 can include a validation 209 of the test payload in which the cloud service recreates a new VM based off the snapshot image captured from the VM configured by the user. The actual validation tool can then take place on the newly created VM. Validation 209 provides a mechanism to verify that the newly created VM works such that testing can take place. Cloud architecture 200 can include test execution and orchestration 210, where the cloud service can dynamically create a test lab 215 consisting of multiple VMs generated from the user provided VM and provisioned either on a cloud service or on an on-premise compute infrastructure. The validation machine and testing machines may be provisioned right away after the customer VM is submitted such that testing can start right away when the validation completes, which subsequently leads to finding and reporting results faster to the user.

Test lab 215 of cloud architecture 200 can be a secured environment in that the test lab VMs run in isolation of the cloud service back end 222. VMs are connected in test lab 215 to a dedicated virtual network that cannot directly communicate with the service back end. Such indirect communications can be realized using a DMZ 220 to handle traffic from test lab 215 to service backend 222. A representational state transfer service (REST)-based communication interface between the testing lab machines and the DMZ 220 may be used for the testing machines to be notified of the validation results and to be told when to start testing. A REST service may be a conventional mechanism of providing interoperability between computer systems on the Internet. Cloud architecture 200 can be built on or integrated with a cloud computing platform.

A system can be arranged to provide cloud testing of VMs using hardware that provides for operation of virtual machines. The system can comprise a set of processors and a storage device. A set of processors is a collection of one or more processors. A storage device can be realized as a set of one or more memory devices. The set of processors and the storage device can be distributed components. The storage device can comprise instructions, which when executed by the set of processors, cause the system to perform operations to: receive a virtual machine, a virtual machine image, or a virtual hard disk by a cloud service, the virtual machine, the virtual machine image, or the virtual hard disk having a test payload provided via a connection with an external site over a physical network; create a set of clones of the virtual machine, the virtual machine image, or the virtual hard disk and inject tools into each clone; test one or more clones of the set in an environment isolated from the physical network and isolated from a backend of the cloud service; and report results of the testing. Reporting the results of the testing can include providing a user with a prioritized list of issues from the testing and an estimate as to the basis for the occurrence each issue.

The operation to receive the virtual machine by the cloud service can include operations to: provide a pristine virtual machine provisioned by the cloud service; and receive the virtual machine generated from installation and configuration of the test payload directly on the pristine virtual machine on a platform of the cloud service via the connection with the external site. A pristine entity refers to an entity in its primitive state before additions or testing are made to the entity. Operations to test the one or more clones can include operations to provision a test lab for testing the one or more clones. The test lab can be a fuzzing test lab. The operations can include operations to provision a validation machine along with provisioning of testing machines of the test lab, and to start the testing of the one or more clones when a validation of the virtual machine or a clone of the virtual machine completes. The operation to report results of the testing can include operations to communicate the results between the test lab and the backend of the cloud service through a subnetwork that controls data flow between the test lab and the backend that isolates the test lab from the backend. The system can include a representational state transfer-based communication interface to communicate between the test lab and the backend of the cloud service.

Figure 3:
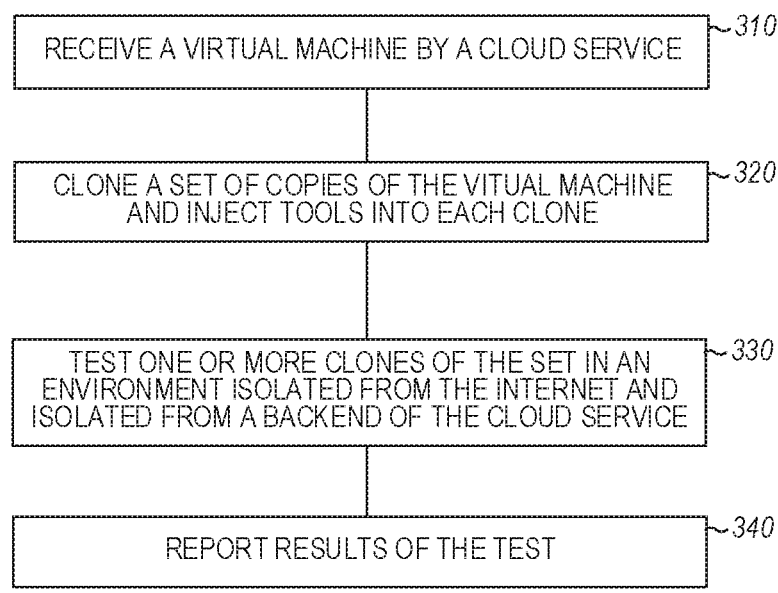
FIG. 3 is a flow diagram of features of an example method of testing using a cloud service, in accordance with various embodiments.

FIG. 3 is a flow diagram of features of an embodiment of an example method 300 of testing using a cloud service. At 310, a virtual machine, a virtual machine image, or a virtual hard disk is received by a cloud service. The virtual machine, the virtual machine image, or the virtual hard disk can have a test payload provided via a connection with an external site over the physical network. Receiving the virtual machine by the cloud service can include: providing a pristine virtual machine provisioned by the cloud service; and receiving the virtual machine generated from installation and configuration of the test payload directly on the pristine virtual machine on a platform of the cloud service via the connection with the external site.

At 320, a set of clones of the virtual machine, the virtual machine image, or the virtual hard disk is created and tools are injected into each clone. At 330, one or more clones of the set are tested in an environment isolated from the physical network and isolated from a backend of the cloud service. Testing the one or more clones can include provisioning a test lab for testing the one or more clones. The test lab can be a fuzzing test lab. Variations of method 300 can include provisioning a validation machine along with testing machines of the test lab, and starting the testing of the one or more clones when a validation of the virtual machine or a clone of the virtual machine completes.

At 340, results of the testing are reported. Reporting results of the testing can include providing a user with a prioritized list of issues from the testing and an estimate as to the basis for the occurrence each issue. Reporting results of the testing can include communicating the results between the test lab and the backend of the cloud service through a subnetwork that controls data flow between the test lab and the backend that isolates the test lab from the backend. Communicating between the test lab and the backend of the cloud service may be conducted via a representational state transfer-based communication interface.

Figure 4:
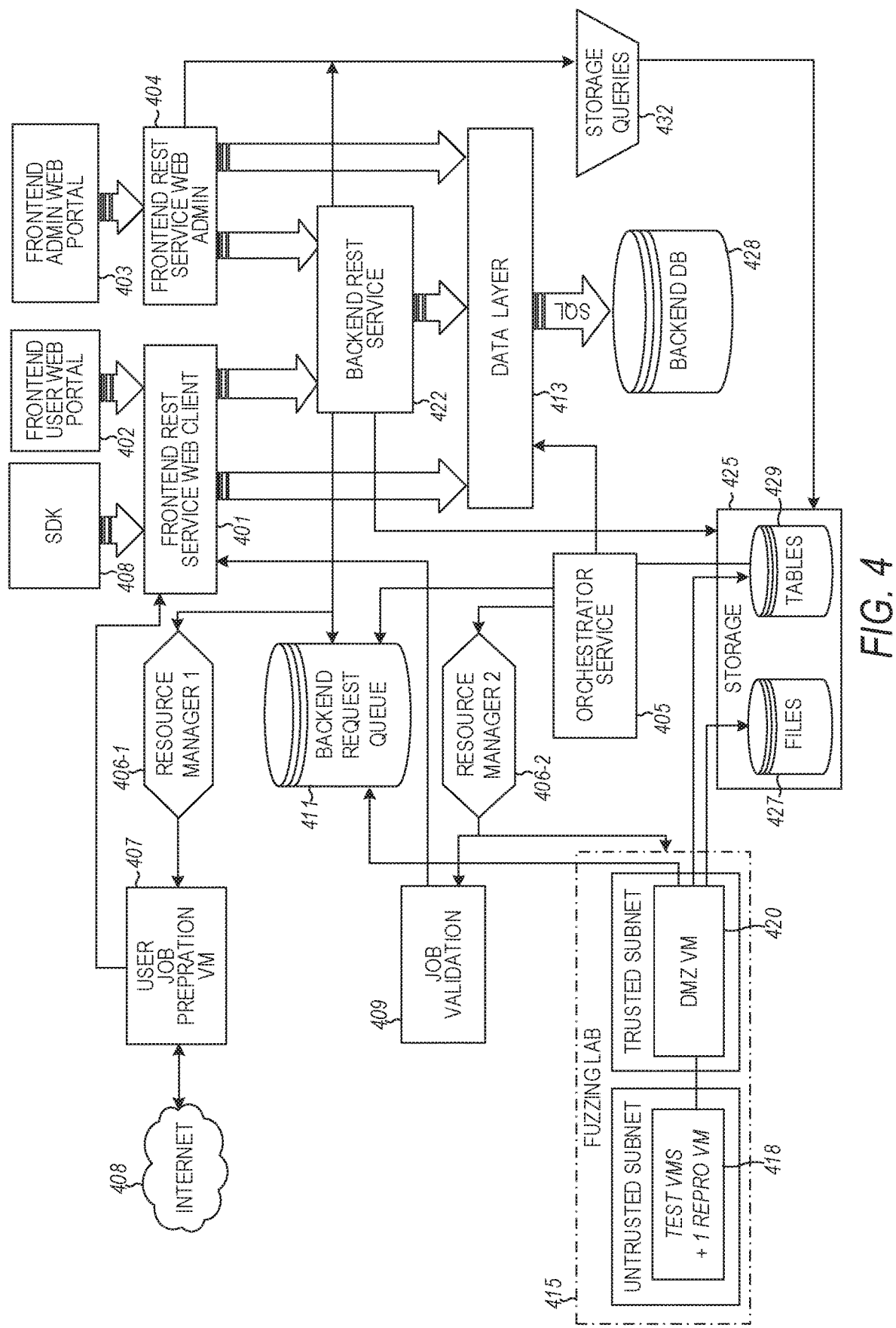
FIG. 4 is a block diagram of a cloud architecture operable to conduct scalable testing, in accordance with various embodiments.

FIG. 4 is a block diagram of a cloud architecture 400 operable to conduct scalable testing. A user can access a system having cloud architecture 400 to request testing a job using frontend customer web portal 402. Frontend customer web portal 402 may be coupled to a frontend REST service 401 for web clients, and frontend REST service 401 can be coupled to receive a software development kit (SDK) 408, which can include a set of software development tools that allows creation of applications for a certain software package, software framework, hardware platform, operating system, or similar development platform. The coupling may be realized by a HTTPS link. Frontend REST service 401 can perform operations to create, read, update, and delete (CRUD) functions of persistent storage on each job, to get job status, to get a remote desktop protocol (RDP) file, and to get crash results. RDP provides a user with a graphical interface to connect to another computer over a network connection.

Cloud architecture 400 can include a frontend administrative web portal 403 that can couple to a frontend REST service 404 for web administration. The coupling may use a https link. Frontend REST service 404 may provide health monitoring of the components of cloud architecture 400, operational quotas of a cloud computing platform in which the testing structure is integrated, quota management of the testing structure, accounts/jobs management, and logs.

Frontend REST service 401 for web clients and frontend REST service 404 for web administration can couple to a backend REST service 422 and to a data layer 413. Data layer 413 can access a backend database 428. Backend database 428 may be a structured query language (SQL) database. Backend REST service 422 can operate to provision a VM for a user to load, to capture the user loaded VM, provide RDP access, and clone VMs. Backend REST service 422 can provision user VM dynamically using a resource manager 406-1 to activate user job preparation VM 407.

User job preparation VM 407 can provide a connection via Internet 408 to operate a pre-validation wizard including a VM of the cloud computing platform on which the test architecture is built, a network interface card (NIC) and a public IP address. The connection via Internet 408 provides the mechanism for a user to provide input to the automated testing of cloud architecture 400 with respect to the subject of the VM being tested. The user is then isolated from the testing methodology of cloud architecture 400. The pre-validation wizard of user job preparation VM 407 provides for submitting a job after running local pre-validation to Frontend REST service 401.

Backend REST service 422 can also communicate with a backend request queue 411 to request test lab provisioning, monitor test lab deployments, and schedule lab termination. Queued requests in backend request queue 411 are consumed (operated on) by an orchestrator service 405. Orchestrator service 405 can use resilient state machines to process a set of requests and notifications. The set of requests and notifications can include submission requests that can capture a customer virtual hard disk (VHD) from a job VM, create a validation VM with customer VHD and attach fuzzing tools to the VHD, and spin-up a validation VM. A VHD is a file format which represents a virtual hard disk drive (HDD). It may contain what is found on a physical HDD, such as disk partitions and a file system, which in turn can contain files and folders.

The set of requests and notifications can include validation notifications. The validation notifications can include notifications to the user by e-mail, to clone validated VMs, to get seeds from a binary large object (BLOB), to specialize VMs and distribute seed files across VMs, and to spin-up VMs in the test lab. A BLOB is a set of binary data stored as a single entity in a database. The set of requests and notifications can include bug report notification to get crash metadata and store info in a SQL database. A bug is defect in a software program of a machine or in a system that causes the program or system to produce an incorrect or unexpected result, or to perform in an unintended manner. The set of requests and notifications can include other job management requests.

Orchestrator service 405 can submit deployments to a resource manager 406-2, which can communicate with job validation 409 to provision a validation job and can communicate with a test lab 415 to provision test lab 415 dynamically. Test lab 415 can be a fuzzing lab. Orchestrator service 405 can communicate with a table 429 of storage 425. Orchestrator service 405 can communicate with data layer 413 to update job status/state and save crash results metadata including a crash dump and a path to input download file.

Job validation 409 can provide a validation VM that validates the job and injects tools from attached VHD. Job validation 409 can include a VM of the cloud computing platform on which the test architecture is built, a NIC, and a public IP address.

Test lab 415 can be provided with network isolation using two subnets (fuzzing machines and backend access), one DMZ, a NSG to restrict inbound and outbound traffic. Test lab 415 can include an untrusted network 418 and a trusted network 420. Untrusted network 418 can include test (fuzzer) VMs and a reproduction of the user created VM. The test VMs provide events traced and crash results. For example, events traced may be obtained by using event tracing for Windows (ETW). The events traced and crash results are provided to trusted network 420. Trusted network 420 can include a DMZ VM, which may have a DMZ agent and a diagnostics agent. An agent is a software entity, which is a set of instructions executable by a machine, capable of acting with a certain degree of autonomy in order to accomplish tasks on behalf of its user machine. An agent is typically defined in terms of its behavior and may execute its function based on the criteria contained within its instruction set. The DMZ VM may push data to tables 429 of storage 425 at a periodic rate. For example, data may be pushed every 10 minutes. The DMZ VM can upload XML results, fuzzer logs, input files, and dumps to files 427 of storage 425. The DMZ VM can also report crashes found to backend request queue 411.

Backend REST service 422 can query job results from files from storage 425 using storage queries 432 using authentication with storage keys. Storage queries 432 can query job results from files 427 of storage 425 and logs from tables 429 of storage 425.

Figure 5A:
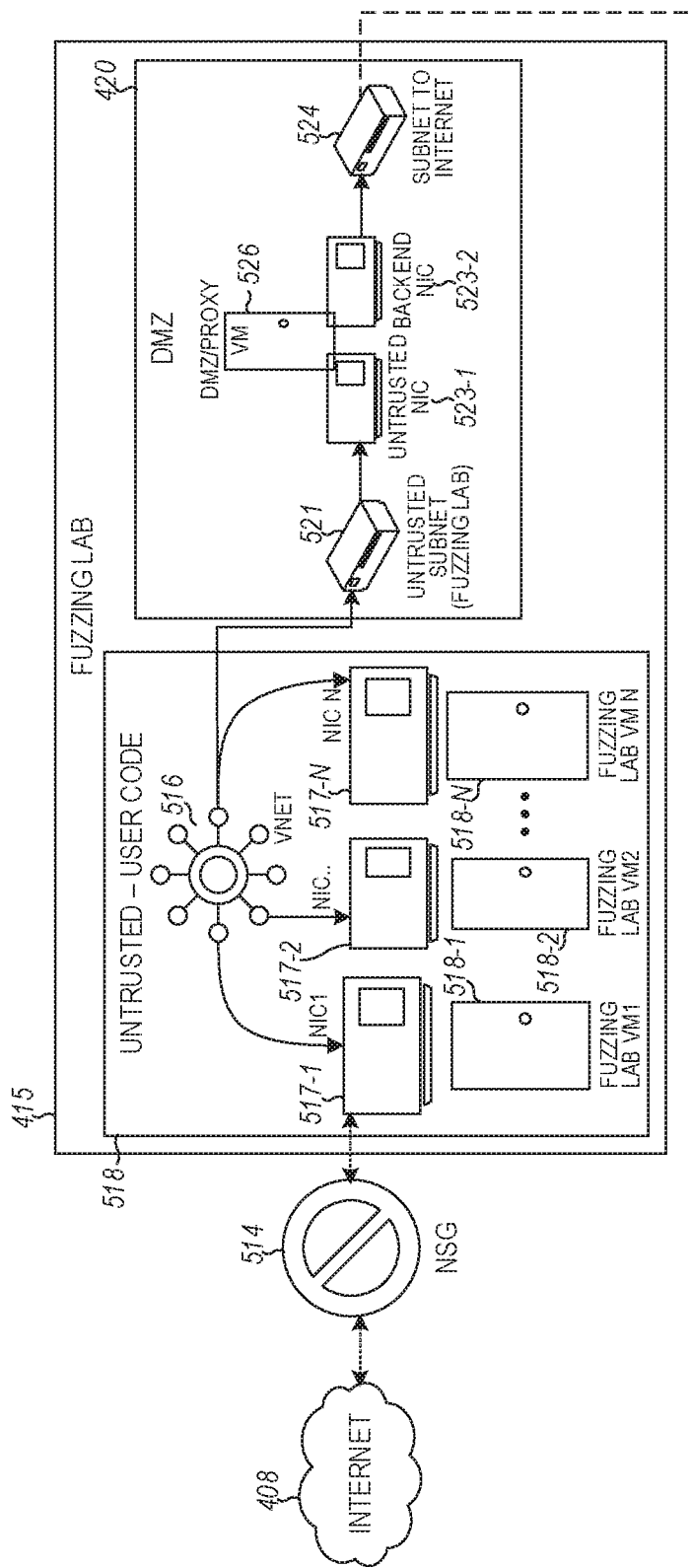
FIGS. 5A-5B illustrate isolation of testing in a test lab arranged as a fuzzing lab in the cloud architecture of FIG. 4, in accordance with various embodiments.
Figure 5B:
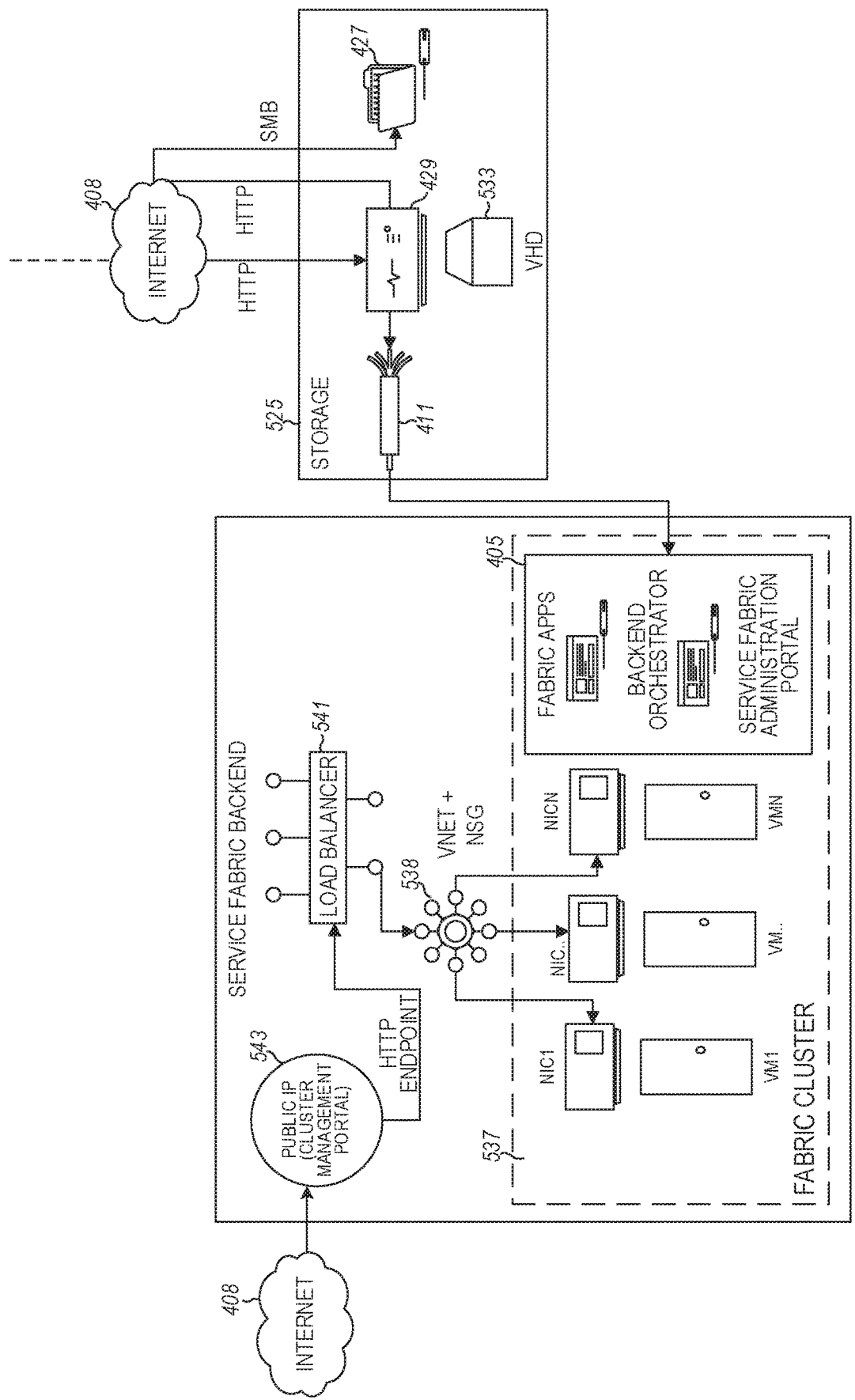

FIGS. 5A-5B illustrate isolation of testing in a test lab arranged as a fuzzing lab 415 in cloud architecture 400 of FIG. 4. Fuzzing lab 415 is provisioned with multiple VMs: fuzzing lab VM 518-1, fuzzing lab VM2 518-2 . . . fuzzing lab VMN 518-N, cloned from a user loaded VM as one testing lab per job. Fuzzing lab 415 is isolated from Internet 408 by NSG 514. Virtual lab VM1 518-1, fuzzing lab VM2 518-2 . . . fuzzing lab VMN 518-N are within untrusted network 418 of untrusted user code and each is accessed through respective NIC 517-1, NIC 517-2 . . . NIC 517-N via virtual network 516. Fuzzing lab 415 can be arranged such that there is no load balancer and no public IP addressing associated with virtual network 516. NSG 514 isolates virtual network 516 from Internet 408 with respect to both outgoing and incoming communication.

DMZ of trusted subnet 420 has a connection 521 to virtual network 516 of untrusted subnet 418 to collect the testing results of fuzzing lab VM1 518-1, fuzzing lab VM2 518-2 . . . fuzzing lab VMN 518-N. Connection 521 communicates with virtual untrusted NIC 523-1 to provide results to DMZ VM 526 that controls data flow to backend NIC 523-2 with connection 524 of trusted subnet 420 to provide data to Internet 408.

DMZ VM 526 can run an agent having a number of features. Data can be communicated using server message block (SMB) pass thru redirection to files 417 of storage 425 (shown in FIG. 4) through netsh portproxy redirection. SMB operates as a conventional application-layer network protocol. Likewise, netsh interface portproxy commands are conventional commands that provide a command-line tool for use in administering servers that act as proxies between networks and applications. Alternatively, a HTTP endpoint at DMZ 420 can be used. ETW/WAD redirection can be used to provide data to tables 429 of storage 525. Storage 525 may include storage 425 of FIG. 4 and backend request queue 411. An HTTP endpoint can be used to send backend notification through backend request queue 411. Though communication to storage 525 can be through Internet 408, the traffic may be contained in a common datacenter if both endpoints of storage 525 and trusted subnet 420 are hosted on a platform in the common datacenter. Alternatively, full virtual network isolation can be used by attaching DMZ NIC 523-2 of fuzzing lab 415 and storage 525 to the same virtual network. Fuzzing lab 415 can test fuzzing lab VM1 518-1, fuzzing lab VM2 518-2 . . . fuzzing lab VMN 518-N without accessing VHD blob 533 or zip files in storage 525.

A service backend fabric 539 is provided that interfaces externally via Internet 408. A fabric, which can also be referred to as framework or platform, describes or defines the manner in which different parts of an entity, such as a service backend, work together to form a single entity. Service backend fabric 539 does not directly communicate with the lab DMZ 526. Instead, communication can be conducted through requests posted on backend request queues 411 from orchestrator service 405. Orchestrator service 405 may be part of a fabric cluster 537 having a number of VMs and associated NICs that communicate via a virtual network 538 that includes a NSG. Service fabric backend 539 can include a load balancer 541 having a HTTP endpoint to a cluster management portal 543 having a public IP. Cluster management portal 543 can be exposed as an HTTP web endpoint on the Public IP, where authentication can be conducted via certificate.

Figures 6A, 6B:
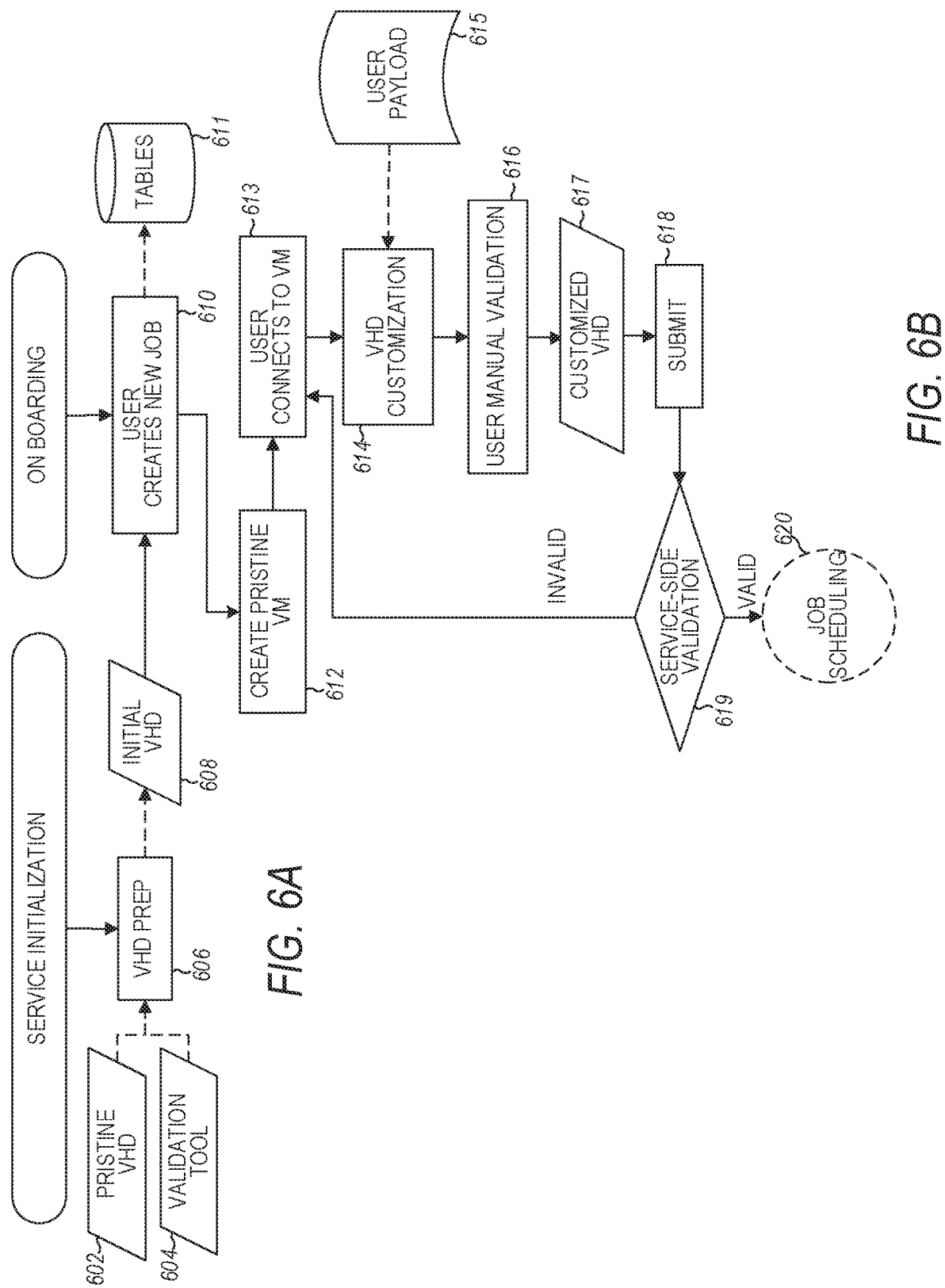

FIGS. 6A-6F are embodiments of example work flows of fuzzing VM management of a job submitted by a user using the example cloud architecture 400 of FIG. 4. FIG. 6A is an embodiment of an example work flow for service initialization. At 602, a pristine VHD is generated. At 604, a validation tool is prepared. At 606, a VHD is prepared for a user using the pristine VHD and the validation tool. At 608, from the VHD preparation, an initial VHD is provided for user on boarding.

FIG. 6B is an embodiment of an example work flow for user on boarding. At 610, the user creates a new job using the initial VHD. At 611, data associated with the creation of the new job is provided to tables 429 of storage 425. At 612, a pristine VM is created in the cloud service. At 613, the user connects to the pristine VM. At 614, VHD customization is conducted in which bits and seed files are installed. Installation includes injecting user payload from 615. At 616, user conducts validation of the customization. This validation can be conducted with user input from a user interface (UI), which may be considered a user manual validation. At 617, a customized VHD is provided. At 618, the customized VHD is submitted for service-side validation. At 619, service-side validation is conducted by the cloud service to determine various factor that may include, but is not limited to, determining if the job description is valid, determining if the VM is accessible, and determining if the VHD is corrupt. If the service-side validation results in an invalid determination, the work flow returns to user connection to the VM at 613 to redo the process from this point. If the service-side validation results in a valid determination, the work flow can continue to job scheduling.

FIG. 6C is an embodiment of an example work flow for job scheduling. At 621, one clone of customer VHD is created for validation. At 622, fuzzing tools are injected into the clone of the customer VHD. At 623, fuzzing of the clone of the customer VHD is conducted for a period of time as a sanity check. For example, the fuzzing may be limited to about an hour for the sanity check. At 624, a determination is made as to whether the sanity check passed. If the sanity check failed, the work flow returns to 613 of the on boarding, where the user connected to the VM, with an indication that the validation failed, from which point, the work flow proceeds with again providing customer payload and other input to the VM. If the sanity check passed, the work flow proceeds to kicking off the fuzzing at 625. At 626, customer VHDs are cloned. At 627, seeds and parameters are assigned to each VHD. At 628, VHDs are uploaded and VMs are created in secure lab 660 (corresponding to test lab 415 of FIG. 4). At 629, another VM is created for secure lab 660. This VM can be provided as a reproduction of the user customized VM. At 630, the job is submitted for execution of testing in secure lab 660. At 665, one or more of the VMs created in secure lab 660 is subjected to fuzzing. For example, a fuzzing may include using a tool such as Microsoft's SAGE, which stands for scalable, automated, guided execution.

FIG. 6D is an embodiment of an example work flow for results collection. At 631, data can be gathered and aggregated. At 632, table 429 and files 427 of storage 425 of cloud architecture 400 of FIG. 4 can be queried, where fuzzing results and ETW logging can be securely upload from secure lab 660. The query may be a SQL query. At 633, the gathered and aggregated data can be bucketized. At 634, the bucketized data can be load into tables such as table 429 of storage 425. Real-time logging of ETW events can also be forwarded to these tables through DMZ and diagnostics of trusted network 420 of secure lab 660.

FIG. 6E is an embodiment of an example work flow for service reporting. At 640, an application performance management (APM) service can be used to monitor the results queried from tables such as table 429 of storage 425. The query may be a SQL query. The APM service may detect performance anomalies, and provide analytic tools to help diagnose issues associated with the testing.

FIG. 6F is an embodiment of an example work flow for user reporting. At 650, a web UI frontend can be used to query tables such as table 429 of storage 425. The query may be a SQL query. The web UI frontend can be use to request the reproduction VM from secure lab 660 via RDP access, at 652.

Figure 7:
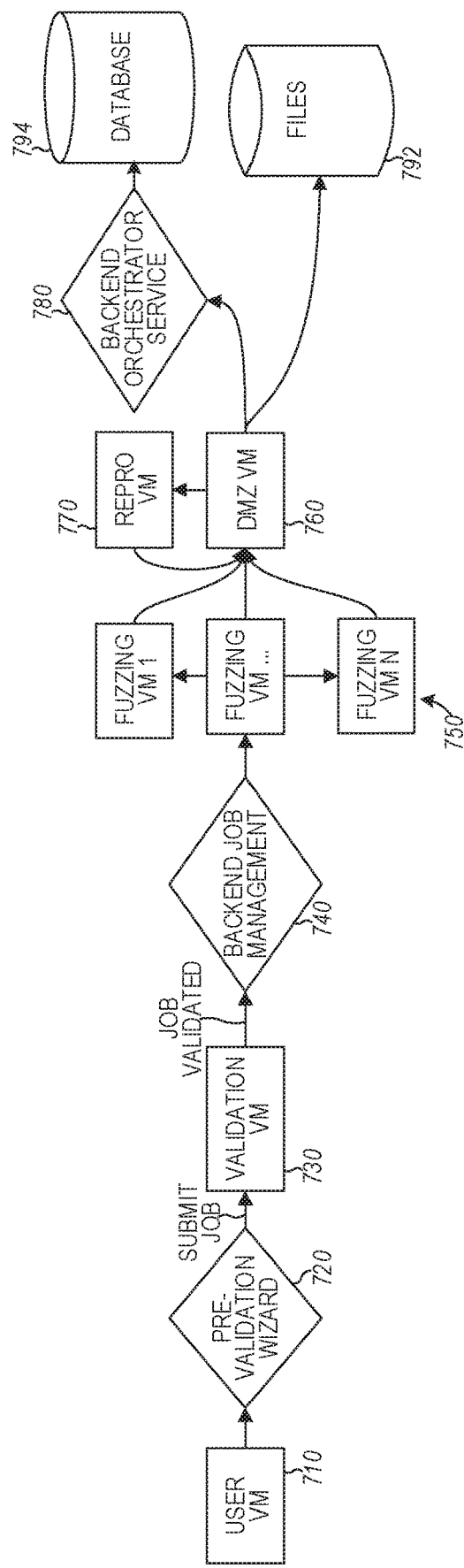
FIG. 7 is a flow diagram of features of an example dataflow of testing a virtual machine, in accordance with various embodiments.

FIG. 7 is a flow diagram of features of an embodiment of an example dataflow of testing a VM. At 710, a user VM is generated. At 720, a pre-validation wizard operates on the user VM from which a job can be submitted. At 730, a validation operation is performed on the VM. Once the job is validated, backend job management operates on the VM to generate a set of n cloned VMs, at 740. At 750, fuzzing is performed on each VM of the set of n VMs. Files of the results can be sent through SMB and notification of the results can be sent through HTTP to a DMZ VM, at 760. At 770, results of finding bugs are read into a reproduction VM. Files of bugs in the reproduction VM can be sent through SMB and notification of the bugs in the reproduction VM can be sent through HTTP to a DMZ VM, at 760. At 780, a backend orchestrator service can process results of the determination of bugs from notification sent from DMZ VM at 760. The processed results can be stored in a database, at 794. The database can be a SQL database. At 792, result files from DMZ VM can be copied to a remote database to share the result files.

Figure 8:
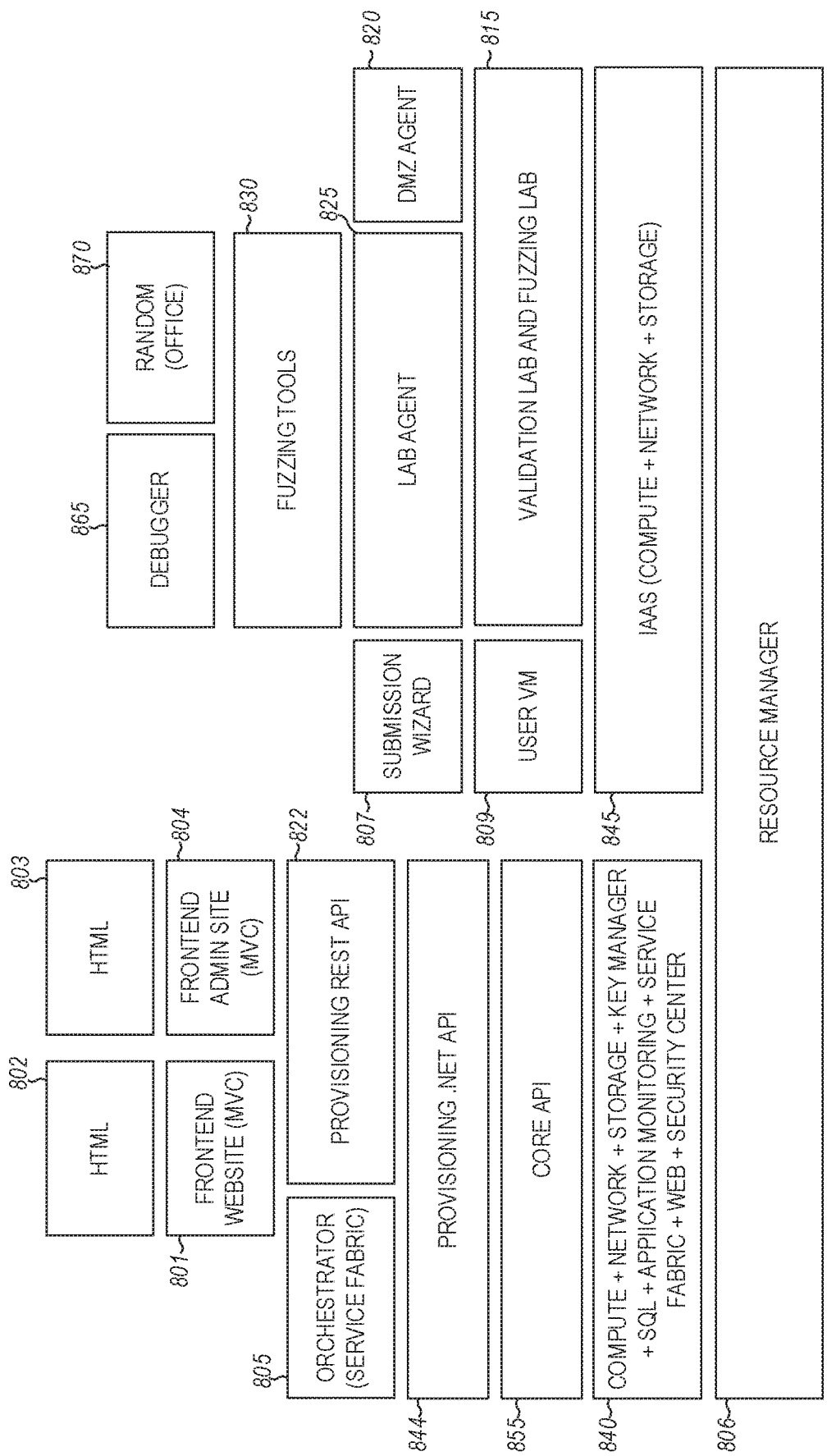
FIG. 8 is a block diagram of a cloud structure for testing built on a cloud computing platform, in accordance with various embodiments.

FIG. 8 is a block diagram of an embodiment of an example cloud structure for testing built on a cloud computing platform for a cloud service. A resource manager 806 can provide a module that can monitor availability of hardware and/or software components for the cloud service and may manage the state of transactions among the components for the cloud service. Infrastructure as a Service (IaaS) layer 845 can provide computing, networking, and storage functions as virtualized computing resources over the Internet. Layer 840 of the cloud computing platform for the cloud service can provide functional instrumentality for computation, network control, storage, security key management, sql control, application monitoring, server fabric operations, web control, operations of a security center.

Core API (application program interface) 855 provides a set of routines, protocols, and tools for use by and for specifying the manner in which components of the cloud service should interact. Provisioning.Net API 844 provides an API that can assign services to users with respect to a network element (manageable logical entity uniting one or more physical devices) and enables the services and allows use of the services by the user. Orchestrator service 805 can provide a service fabric that, among other things, operates on user-based requests, submits deployments, updates job status and/or states, and saves testing results. Provisioning REST API 822 provides an API that can deal with provisioning a VM, capturing a VM, providing RDP access, and cloning a VM. Frontend website module 801 can provide a user portal as a model-view-controller (MVC), which is software architecture for implementing user interfaces in which an application is divided into three interconnected parts to separate internal representations of information from the manner that the information is presented to and accepted from a user. Frontend admin site module 804 can provide an administrative portal as a MVC. Access to the cloud service can be provided by HTML 802 and HTML 803, which may be angular http clients, where an angular http client provides a framework for a client to communicate with a server using a http request/response protocol.

User VM module 809 can operate to manage the generation of a user VM, which may include such activities as inserting user payload and other data into the user VM. Validation lab and fuzzing lab module 815 provides a module that tests an initial VM for validation and tests a set of VMs cloned from the user VM. Validation lab and fuzzing lab module 815 operates in isolation from the Internet and the backend of the cloud services. Submission wizard 807 provides a mechanism for a user to provide the subject for test and the capability to run a local pre-validation. Lab agent 825 can operate to control testing in validation lab and fuzzing lab module 815 and reporting of test results to a DMZ VM. DMZ agent 820 can operate to control the pass through of test results from validation lab and fuzzing lab module 815 to databases. Fuzzing tools 830 provide a module to manage tools for testing in validation lab and fuzzing lab module 815. Debugger 865 can provide a module for security fuzzing such as Microsoft's SAGE. Random module 870 represents that the functionality of the cloud service is expandable as additional functional modules can be added.

Figure 9:
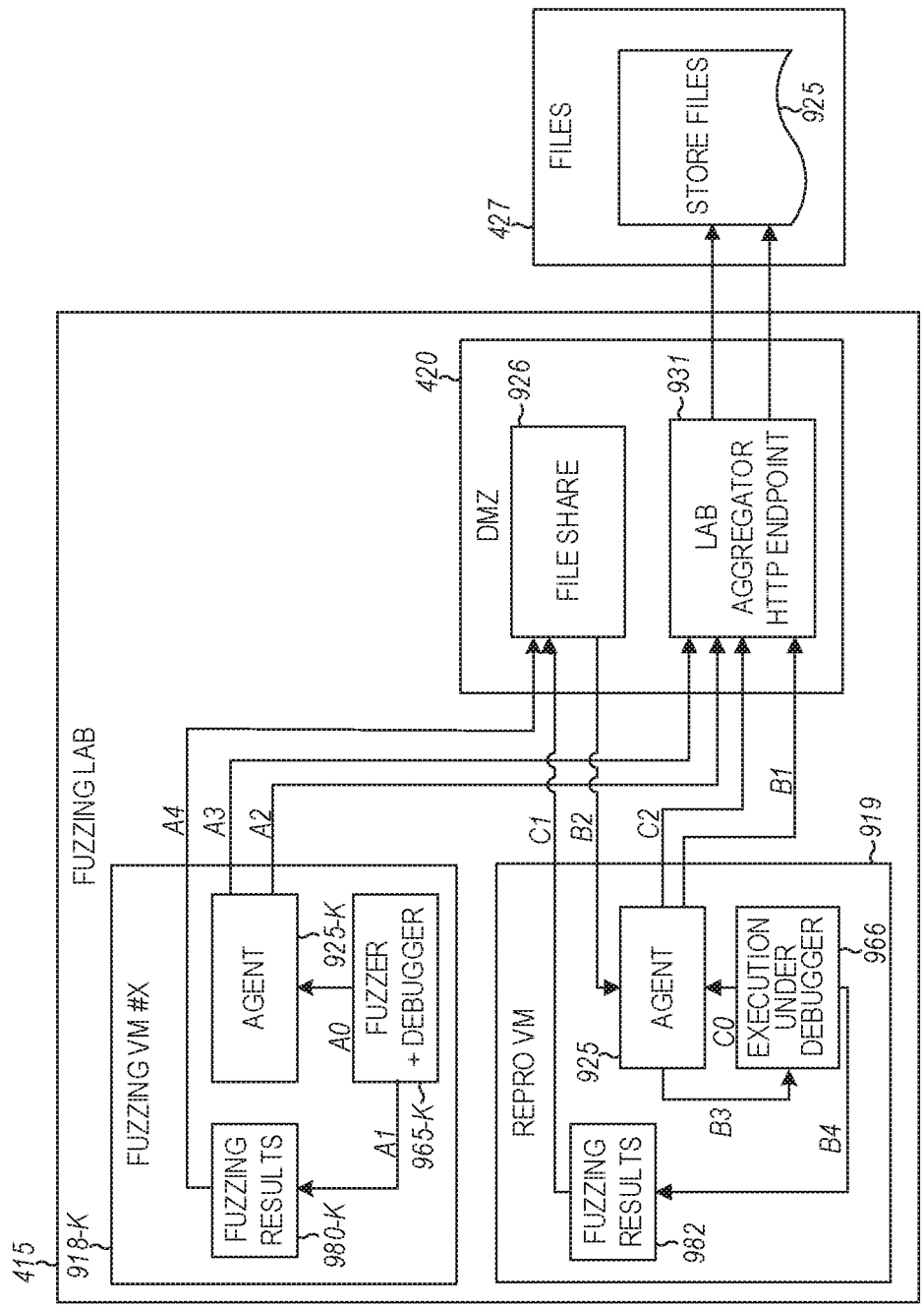
FIG. 9 is an illustration of an example collection of results in the test lab of the cloud architecture of FIG. 4, in accordance with various embodiments.

FIG. 9 is an illustration of an embodiment of an example collection of results in test lab 415 of architecture 400 of FIG. 4. For each fuzzing VM-k 918-$k$, $1 \leq k \leq N$, a fuzzer and debugger 965-$k$ operates on fuzzing VM-k. At A0, fuzzer and debugger 965-$k$ can report a bug found to agent 925-$k$ and, at A1, can provide results to a results file 980-$k$. At A2, agent 925-$k$ of fuzzing VM-k 918-$k$ can notify query lab aggregator 931 of the bug found and, at A3, query lab aggregator 931 as to whether there is interest in the bug found. At A4, agent 925-$k$ can copy the bug found to files 926 in DMZ 420 of cloud architecture 400 of FIG. 4 and enqueue the bug for reproduction. At A5, lab aggregator 931 can provide the results file 980-$k$ to DMZ 420 at A4 to a file with user identification 928 in files 427 of storage 425 of cloud architecture 400 of FIG. 4.

At B1, an agent 925 of reproduction VM 919 can query lab aggregator 931 as to whether the found bug should be reproduced. At B2, the bug found is dequeued from files 926 in DMZ 420 to agent 925. At B3, agent 925 runs and attempts to reproduce dequeued bug under execution 966 under debugger 965-$k$. At B4, repro result is copied to results file 982. At C0, reproduction of the bug can be reported to agent 925 under ETW. At C, the results file 982 is put in files 926 in DMZ 420. At C2, agent 925 notifies lab aggregator 931 that the bug is reproduced. At C3, lab aggregator 931 can provide the results file for reproduction VM 919 provided to DMZ 420 at C2 to a file with user identification 428 in files 427 of storage 425.

Elements associated with the cloud architectures, as taught herein, may communicate over a network (not shown). The network may include local-area networks (LAN), wide-area networks (WAN), wireless networks (e.g., a IEEE 802.11 wireless local area network or a cellular wireless wide area network), the Public Switched Telephone Network (PSTN) network, ad hoc and device-to-device (D2D) networks, personal area networks (e.g., Bluetooth) or other combinations or permutations of network protocols and network types. The networks may include a single local area network (LAN) or wide-area network (WAN), or combinations of LAN's or WAN's, such as the Internet. The various devices coupled to network may be coupled to the network via one or more wired or wireless connections.

Embodiments described herein may be implemented in one or a combination of hardware, firmware, and software. Embodiments may also be implemented as instructions stored on one or more machine-readable storage devices, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In an example, the software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform one or more methodologies described herein.

For example, a non-transitory machine-readable medium can comprise instructions, which when executed by a set of processors, ca cause a system to perform operations comprising: receiving a virtual machine, a virtual machine image, or a virtual hard disk by a cloud service, the virtual machine, the virtual machine image, or the virtual hard disk having a test payload provided via a connection with an external site over the physical network; creating a set of clones of the virtual machine, the virtual machine image, or the virtual hard disk and inject tools into each clone; testing one or more clones of the set in an environment isolated from the physical network and isolated from a backend of the cloud service, and reporting results of the testing. Reporting results of the testing can include providing a user with a prioritized list of issues from the testing and an estimate as to the basis for the occurrence each issue. With respect to the non-transitory machine-readable medium, receiving the virtual machine by the cloud service can include providing a pristine virtual machine provisioned by the cloud service; and receiving the virtual machine generated from installation and configuration of the test payload directly on the pristine virtual machine on a platform of the cloud service via the connection with the external site. In addition, testing the one or more clones can include provisioning a test lab for testing the one or more clones. The test lab can be a fuzzing test lab.

Variations of the operations or similar operation can include provisioning a validation machine along with testing machines of the test lab, and starting the testing of the one or more clones when a validation of the virtual machine or a clone of the virtual machine completes. Reporting results of the testing can include communicating the results between the test lab and the backend of the cloud service through a subnetwork that controls data flow between the test lab and the backend that isolates the test lab from the backend. The operations can include communicating between the test lab and the backend of the cloud service via a representational state transfer-based communication interface.

Figure 10:
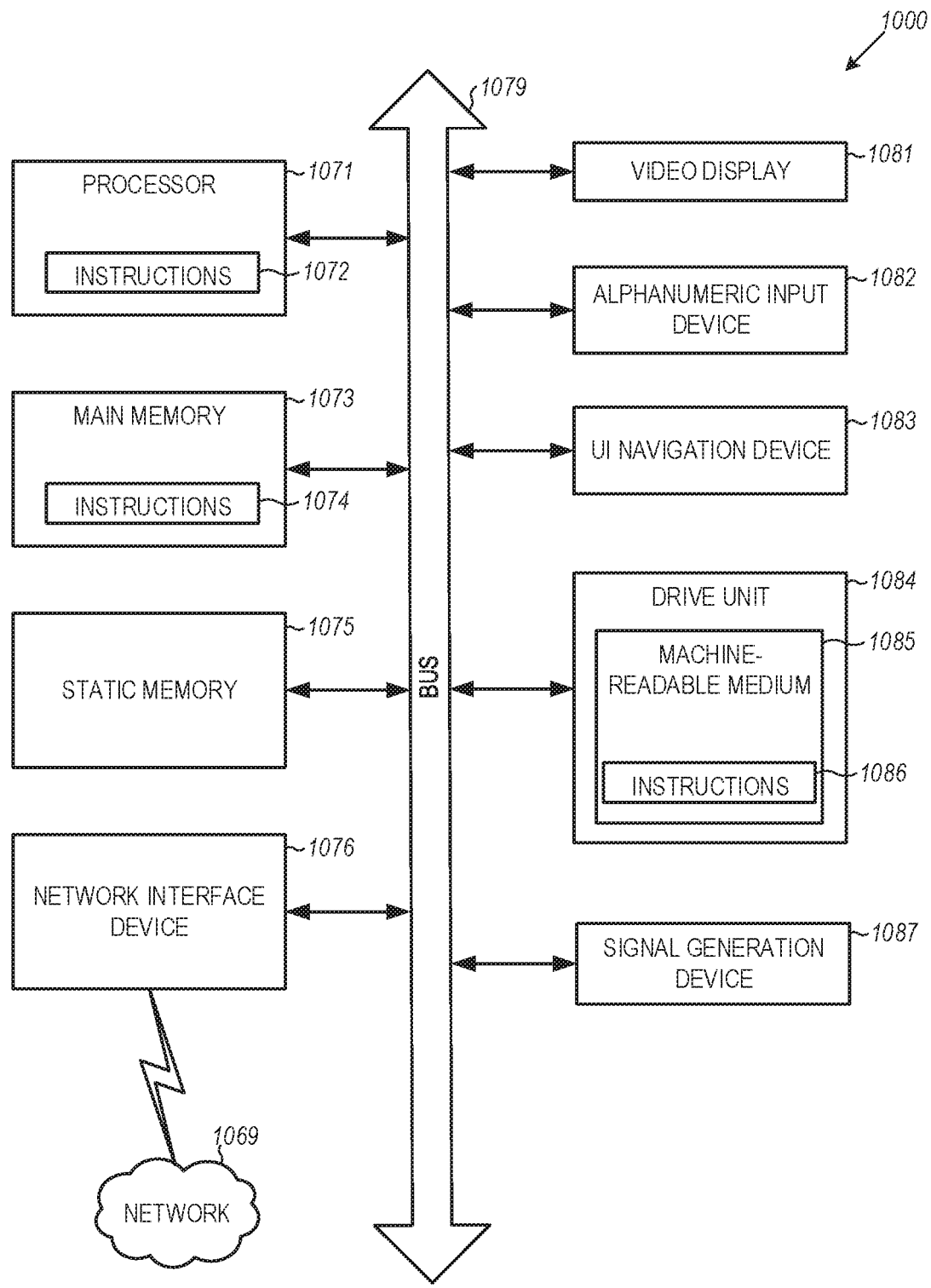
FIG. 10 is a block diagram illustrating features of an embodiment of a machine system, in accordance with various embodiments.

FIG. 10 is a block diagram illustrating features of an embodiment of a machine system 1000, within which a set or sequence of instructions may be executed to cause the machine to perform any one of the methodologies discussed herein. Machine system 1000 represents one or more machines associated with the cloud architectures, as taught herein. Machine system 1000 may be a machine that operates as a standalone device or may be networked to other machines. In a networked deployment, the machine system 1000 may operate in the capacity of either a server or a client machine in server-client network environments, or it may act as a peer machine in peer-to-peer (or distributed) network environments. Further, while machine system 1000 is shown only as a single machine, the term "machine system" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Machine system 1000 can include one or more processors 1071, a main memory 1073 and a static memory 1075, which communicate with each other via a link 1079 (e.g., a bus). Machine system 1000 may further include a video display unit 1081, an alphanumeric input device 1082 (e.g., a keyboard), and a user interface (UI) navigation device 1083 (e.g., a mouse). Video display unit 1081, alphanumeric input device 1082, and UI navigation device 1083 may be incorporated into a touch screen display. Machine system 1000 may additionally include a storage device 1084 (e.g., a drive unit), a signal generation device 1087 (e.g., a speaker), a network interface device 1076, and one or more sensors (not shown), such as a global positioning system (GPS) sensor, compass, accelerometer, or other sensor.

Storage device 1084 can include a machine-readable medium 1085 on which is stored one or more sets of data structures and instructions 1086 (e.g., software) embodying or utilized by any one or more of the methodologies or functions described herein. The instructions 1086 may also reside, completely or at least partially, within the main memory 1073, static memory 1075, and/or within the processors 1071 during execution thereof by machine system 1000, with main memory 1073, static memory 1075, and processors 1071 also constituting machine-readable media.

While the machine-readable medium 1085 is illustrated in an example embodiment to be a single medium, the term "machine-readable medium" may include a single medium or multiple media (e.g., a centralized or distributed database, and/or associated caches and servers) that store the one or more instructions 1086. The term "machine-readable medium" shall also be taken to include any tangible medium that is capable of storing, encoding or carrying instructions for execution by the machine and that cause the machine to perform any one or more of the methodologies taught herein or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1086 may further be transmitted or received over a communications network 1069 using a transmission medium via the network interface device 1076 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
   a set of processors;
   a storage device comprising instructions, which when executed by the set of processors, cause the system to perform operations to:
   receive a virtual machine, a virtual machine image, or a virtual hard disk by a cloud service, the cloud service operating on a processing platform, with the virtual machine, the virtual machine image, or the virtual hard disk having a test payload provided via a connection with an external site over a physical network;

create a set of clones of the virtual machine, the virtual machine image, or the virtual hard disk and inject tools into each clone;

create a reproduction of the received virtual machine, the received virtual machine image, or the received virtual hard disk;

test one or more clones of the set in an environment isolated from the physical network and isolated from a backend of the cloud service such that the test of the one or more clones includes use of the injected tools and is conducted within the isolated environment that is secured without interaction from the physical network and without interaction with the backend during the test once testing has begun, the backend including systems, other than the isolated environment, on the processing platform for the cloud service, the environment isolated from the backend by a security virtual machine that controls data flow from the isolated environment to the backend such that the backend is protected from untrusted features of the clones under test;

in response to a determination of a defect in a tested clone, provide the defect to the reproduction via the security virtual machine;

run the reproduction, in the isolated environment, with respect to the defect and provide results of running the reproduction to the security virtual machine; and report results of the testing.

2. The system of claim 1, wherein the operation to receive the virtual machine by the cloud service includes operations to:

provide a pristine virtual machine provisioned by the cloud service; and receive the virtual machine generated from installation and configuration of the test payload directly on the pristine virtual machine on the processing platform of the cloud service via the connection with the external site.

3. The system of claim 1, wherein the operation to test the one or more clones includes operations to provision a test lab for testing the one or more clones.

4. The system of claim 3, wherein the test lab is provisioned as a fuzzing test lab.

5. The system of claim 3, wherein the operations include operations to provision a validation machine along with testing machines of the test lab, and to start the testing of the one or more clones when a validation of the virtual machine or a validation of a clone of the virtual machine completes.

6. The system of claim 3, wherein operation to report results of the testing includes operations to communicate the results between the test lab and the backend of the cloud service through the security virtual machine.

7. The system of claim 3, wherein the system includes a representational state transfer-based communication interface to communicate between the test lab and the backend of the cloud service.

8. The system of claim 1, wherein the operations to report results of the testing includes operations to provide a user with a prioritized list of issues from the testing and an estimate as to the basis for the occurrence of each issue.

9. A method comprising:

receiving a virtual machine, a virtual machine image, or a virtual hard disk by a cloud service, the cloud service operating on a processing platform, with the virtual machine, the virtual machine image, or the virtual hard disk having a test payload provided via a connection with an external site over a physical network;

creating a set of clones of the virtual machine, the virtual machine image, or the virtual hard disk and inject tools into each clone;

creating a reproduction of the received virtual machine, the received virtual machine image, or the received virtual hard disk;

testing one or more clones of the set in an environment isolated from the physical network and isolated from a backend of the cloud service such that the testing of the one or more clones includes using the injected tools and conducting within the isolated environment that is secured without interaction from the physical network and without interaction with the backend during the test once testing has begun, the backend including systems, other than the isolated environment, on the processing platform for the cloud service, the environment isolated from the backend by a security virtual machine that controls data flow from the isolated environment to the backend such that the backend is protected from untrusted features of the clones under test;

providing, in response to a determination of a defect in a tested clone, the defect to the reproduction via the security virtual machine;

running the reproduction, in the isolated environment, with respect to the defect and providing results of running the reproduction to the security virtual machine; and reporting results of the testing.

10. The method of claim 9, wherein receiving the virtual machine by the cloud service includes:

providing a pristine virtual machine provisioned by the cloud service; and receiving the virtual machine generated from installation and configuration of the test payload directly on the pristine virtual machine on the processing platform of the cloud service via the connection with the external site.

11. The method of claim 9, wherein testing the one or more clones includes provisioning a test lab for testing the one or more clones.

12. The method of claim 11, wherein the test lab is a fuzzing test lab.

13. The method of claim 11, wherein the method includes provisioning a validation machine along with testing machines of the test lab, and starting the testing of the one or more clones when a validation of the virtual machine or a clone of the virtual machine completes.

14. The method of claim 11, wherein reporting results of the testing includes communicating the results between the test lab and the backend of the cloud service through the security virtual machine.

15. The method of claim 11, wherein the method includes communicating between the test lab and the backend of the cloud service via a representational state transfer-based communication interface.

16. The method of claim 9, wherein reporting results of the testing includes providing a user with a prioritized list of issues from the testing and an estimate as to the basis for the occurrence of each issue.

17. A non-transitory machine-readable medium comprising instructions, which when executed by a set of processors, cause a system to perform operations comprising:

receiving a virtual machine, a virtual machine image, or a virtual hard disk by a cloud service, the cloud service operating on a processing platform, with the virtual machine, the virtual machine image, or the virtual hard disk having a test payload provided via a connection with an external site over a physical network;

creating a set of clones of the virtual machine, the virtual machine image, or the virtual hard disk and inject tools into each clone;

creating a reproduction of the received virtual machine, the received virtual machine image, or the received virtual hard disk;

testing one or more clones of the set in an environment isolated from the physical network and isolated from a backend of the cloud service such that the testing of the one or more clones includes using the injected tools and conducting within the isolated environment that is secured without interaction from the physical network and without interaction with the backend during the test once testing has begun, the backend including systems, other than the isolated environment, on the processing platform for the cloud service, the environment isolated from the backend by a security virtual machine that controls data flow from the isolated environment to the backend such that the backend is protected from untrusted features of the clones under test;

providing, in response to a determination of a defect in a tested clone, the defect to the reproduction via the security virtual machine;

running the reproduction, in the isolated environment, with respect to the defect and providing results of running the reproduction to the security virtual machine; and reporting results of the testing.

18. The non-transitory machine-readable medium of claim 17, wherein receiving the virtual machine by the cloud service includes:

providing a pristine virtual machine provisioned by the cloud service; and receiving the virtual machine generated from installation and configuration of the test payload directly on the pristine virtual machine on the processing platform of the cloud service via the connection with the external site.

19. The non-transitory machine-readable medium of claim 17, wherein testing the one or more clones includes provisioning a test lab for testing the one or more clones.

20. The non-transitory machine-readable medium of claim 19, wherein the test lab is a fuzzing test lab.

21. The non-transitory machine-readable medium of claim 19, wherein the operations include provisioning a validation machine along with testing machines of the test lab, and starting the testing of the one or more clones when a validation of the virtual machine or a clone of the virtual machine completes.

22. The non-transitory machine-readable medium of claim 19, wherein reporting results of the testing includes communicating the results between the test lab and the backend of the cloud service through the security virtual machine.

23. The non-transitory machine-readable medium of claim 19, wherein the operations include communicating between the test lab and the backend of the cloud service via a representational state transfer-based communication interface.

24. The non-transitory machine-readable medium of claim 17, wherein reporting results of the testing includes providing a user with a prioritized list of issues from the testing and an estimate as to the basis for the occurrence of each issue.

* * * * *